W. E. BAILEY.
Animal Traps.
No. 149,024. Patented March 31, 1874.
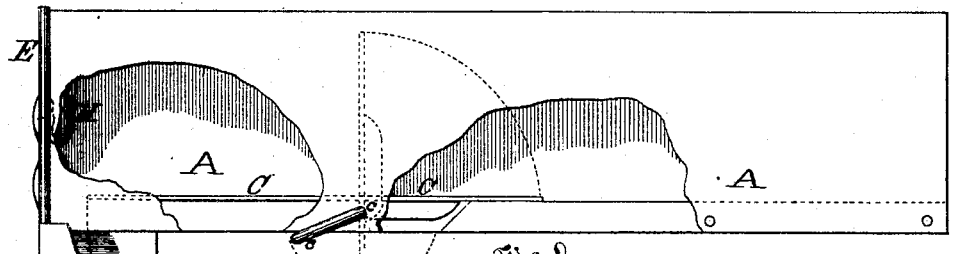
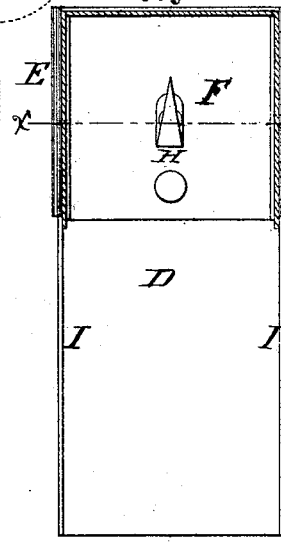
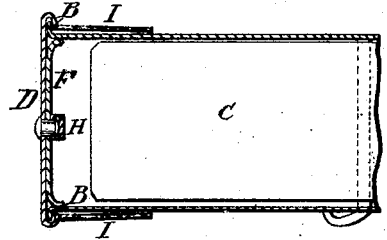
Witnesses:
Chas. C. Wilson
J. C. Wildman
Inventor.
William E. Bailey
by his attorneys
Cox & Cox

UNITED STATES PATENT OFFICE.

WILLIAM E. BAILEY, OF MEADVILLE, MISSOURI.

IMPROVEMENT IN ANIMAL-TRAPS.

Specification forming part of Letters Patent No. 149,024, dated March 31, 1874; application filed July 8, 1873.

*To all whom it may concern:*

Be it known that I, WILLIAM E. BAILEY, of Meadville, in the county of Linn and State of Missouri, have invented a new and useful Improvement in Animal-Traps, of which the following is a specification, reference being had to the accompanying drawings.

My invention relates to an improvement in animal-traps; and consists in providing a rectangular tube of suitable size, one end of which is left open, and the other provided with lips, upon which is fitted a rectangular three-sided shield, that extends downward at right angles to the tube. Near the shield, in the lower side of the tube, is cut a trap-door, the end farthest removed from the shield being weighted. The bait is fastened to the upper part of the shield. The animal entering the tube, upon approaching the bait, is let down into a vessel of water, the shield preventing its escape while descending.

The object of the invention is to provide a convenient and efficient animal-trap, especially designed for rats and mice.

Figure 1 is a side elevation of a device embodying the elements of the invention, certain parts being broken out to disclose internal construction. Fig. 2 is a transverse section of same. Fig. 3 is a view showing especially the lips B.

A is the tube, the bottom or lower side of which is preferably of wood, and the other sides of sheet-iron. One of its ends is open and arranged to afford a ready access. Its other end is provided with the lips B, designed to fit the flanges of the shield D, as will more fully appear hereinafter. A part of the lower side of the tube adjacent to the shield end is removed, and the trap-door C hung in its place, said trap being weighted, so that when the animal passes beyond the axle *c* the door will turn; and it is also arranged so that, the shield being attached, the light is as nearly excluded as possible. D is the shield, which is preferably of sheet-iron. Its upper part is a straight sheet, arranged with the flanges E, so as to fit upon the lips B, a lipped piece, F, being attached inside shield D to facilitate adjustment. In the center of the piece F is the hook H, upon which the bait is fastened. The lower part of the shield D, that extends, when the shield is in place, below the lower side of the tube, is a continuation of the flanged sheet, with rectangular sides I, that project toward the door C, to prevent the escape of the animal as it is falling. The axle *c* is attached to the door C, and bent under the lower edge of the tube, so that the weighted end cannot be carried beyond the perpendicular.

To operate the device, attach the bait to the hook H, and fit the shield upon the tube. Having provided a vessel of water, place the end of the shield in it, and the tube in a horizontal position, as may be convenient. The animal entering is attracted toward the bait, and, coming upon the door C, falls into the vessel of water, the shield directing its descent.

To clean the device, it is only necessary to remove the shield, when the parts may be readily washed or scoured.

In case the animals are particularly shy, the tube may be covered with rubbish, or otherwise disguised.

I am aware that traps have been long known in which weighted doors similar to that I have described are used, and I am aware that divers expedients have been employed to direct and entice the animals upon the doors; but I know of no trap in which is shown the combinations I employ. It is a well-known fact that rats and mice instinctively seek holes and crevices. Upon this theory I have devised the tube and arranged the door so that the passage is nearly dark. If the animal is running rapidly, when tripped by the door it is thrown against the shield and into the water. I do not, however, claim broadly any of the parts described; but, What I do claim as new, and desire to secure by Letters Patent, is—

The tube A, having the lips B, trap-door C, and the shield D, provided with the flanges E, sides I, piece F, and hook H, when combined and arranged substantially as specified.

In testimony that I claim the foregoing improvement in animal-traps, as above described, I have hereunto set my hand and seal this 18th day of June, 1873.

WILLIAM E. BAILEY. [L. S.]

Witnesses:
ABE MARKS,
A. D. BLACK.